March 31, 1931.        G. A. ROBERDS        1,798,384
CYCLE DRIVING APPARATUS
Filed June 19, 1930        2 Sheets-Sheet 1
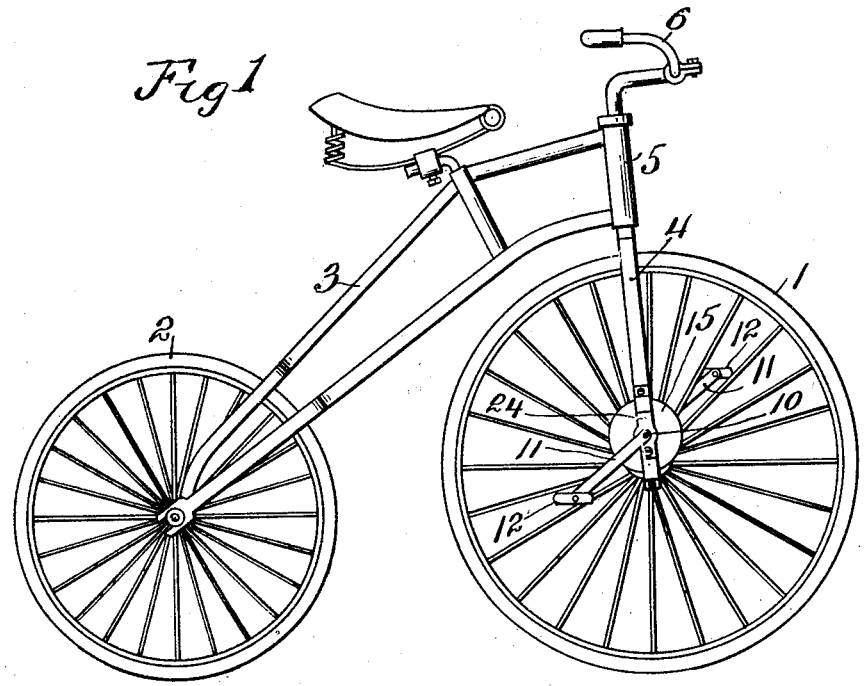
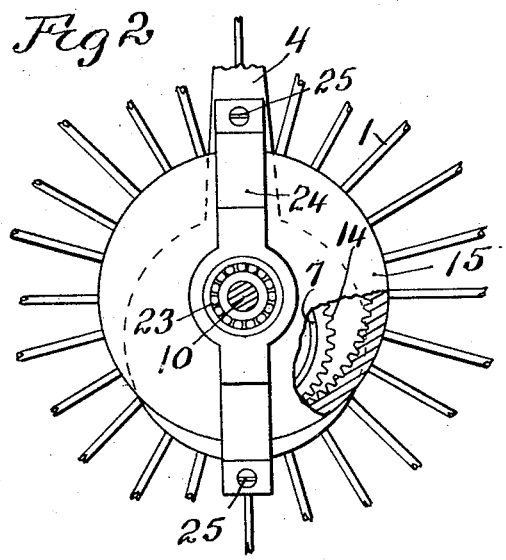
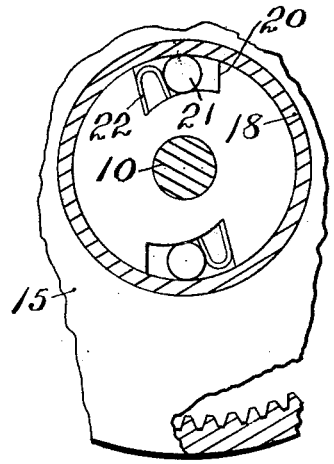
INVENTOR
Garfield A. Roberds
BY Warren D. House
His ATTORNEY
Witness
H. C. Olson

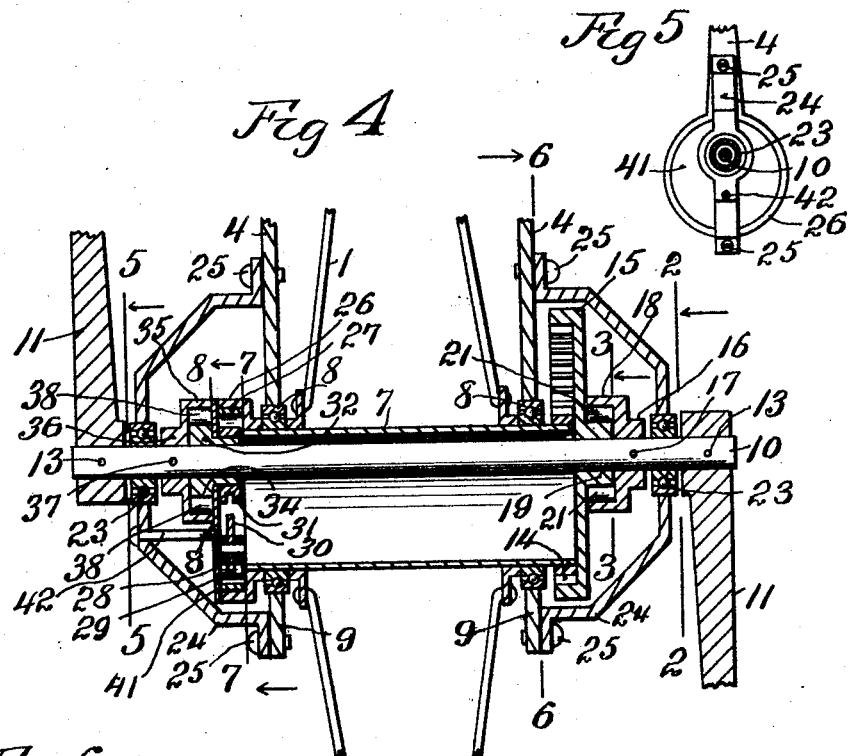
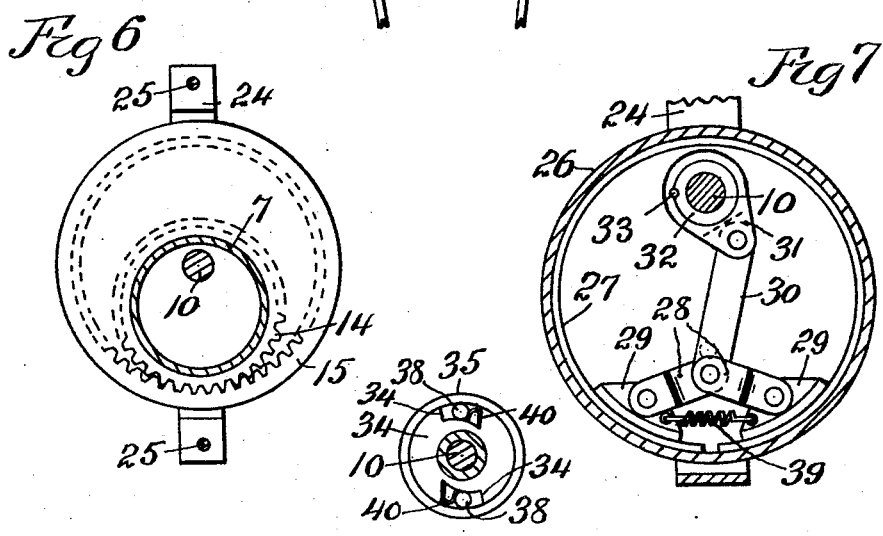

Patented Mar. 31, 1931

1,798,384

UNITED STATES PATENT OFFICE

GARFIELD A. ROBERDS, OF OLATHE, KANSAS, ASSIGNOR OF ONE-HALF TO JOSEPH FELDMAN, OF OLATHE, KANSAS

CYCLE DRIVING APPARATUS

Application filed June 19, 1930. Serial No. 462,387.

My invention relates to improvements in cycle driving apparatus adapted for use on unicycles, bicycles, tricycles and motor cycles.

One of the objects of my invention is to provide a novel driving apparatus which is simple, cheap, strong, durable, not likely to get out of order, which is easily operated, and is applicable to cycles of usual type, and which is efficient in its operation.
A further object of my invention is the provision of novel means actuated through the driving mechanism for applying a brake to the driving carrying wheel of the cycle, which braking mechanism is noiseless and certain in action, and which can be applied in any position of the main driving shaft of the cycle.

Still another object of my invention is the provision of novel clutch mechanism which is simple, noiseless and efficient for communicating motion forwardly to the carrying wheel, while permitting coasting, when the driving shaft is not revolved.

The novel features of my invention are hereinafter fully described and claimed.

In the accompanying drawings, which illustrate my invention as applied to a bicycle, Fig. 1 is a side elevation of a bicycle provided with my improvements.

Fig. 2 is an enlarged section on the line 2—2 of Fig. 4.

Fig. 3 is an enlarged section on the line 3—3 of Fig. 4.
Fig. 4 is a central longitudinal sectional view through the hub of the front carrying wheel.

Fig. 5 is a reduced section on the line 5—5 of Fig. 4.
Fig. 6 is a section on the line 6—6 of Fig. 4.

Fig. 7 is an enlarged section on the line 7—7 of Fig. 4.

Fig. 8 is a section on the line 8—8 of Fig. 4.
Similar reference characters designate similar parts in the different views.

1 designates the front driving carrying wheel, which may be the wheel of a unicycle, bicycle, tricycle or motor cycle.
The rear wheel 2 supports in the usual manner the frame 3 having a front fork 4 revoluble in the usual steering post 5 and having the usual handle bars 6.

The wheel 1 has a tubular hub 7 having on its periphery two sets of ball bearings 8, the inner races of which are fastened to the hub 7, and the outer races of which are respectively fastened to enlargements 9 of the lower ends of the arms of the fork 4.

For driving the wheel 1, there is extended horizontally through it an eccentrically disposed driving member comprising a shaft 10 having fastened to its respective ends the usual pedal cranks 11, carrying the usual pedals 12, and attached removably to the shaft 10 by removable pins 13.

Rigidly attached to the periphery of the hub 7 at one end thereof is a spur gear wheel 14 the teeth of which mesh with the teeth of an internal gear wheel 15, which encircles the gear wheel 14 and which is revoluble on the driving shaft 10.

The outer side of the internal gear wheel 15 is closed, thus guarding the clothing of the rider from entering between the teeth of the two gear wheels 14 and 15.

When forwardly revolved, clock-wise as viewed in Fig. 1, the internal gear wheel 15 will revolve the gear wheel 14 and with it the driving wheel 1 at a multiplied rate of speed, and with the use of only two gear wheels and the limination of a chain or other intermediate driving mechanism.

Clutch mechanism is provided for imparting rotation from the shaft 10 to the internal gear wheel 15. The mechanism shown comprises a clutch member 16 mounted removably concentrically on the shaft 10 to which it is secured by a removable pin 17. The clutch member 16 has an inwardly extending annular concentric flange 18 which encircles the outwardly extending hub 19 of the internal gear wheel 15.

The hub 19 is provided with one or more, two as shown, peripheral notches 20 the bottom of each of which, as shown in Fig. 3 is eccentric, and, preferably, but not necessarily, arcuate as shown.

Respectively mounted in the notches 20 are two rollers 21 which, when the shaft 10 is rotated clock-wise, as shown in Fig. 3, the flange 18 will also rotate in a like direction and will cause the rollers 21 to lock together the flange 18 and the hub, thereby effecting the rotation forwardly of the internal gear wheel 15, gear wheel 14 and hub 7, when the shaft 10 is forwardly revolved, but permitting the gear wheel 15 and carrying wheel 1 to coast, when the shaft 10 is stopped or slowed down.

Two U shaped springs 22 respectively in the notches 20 respectively normally force the rollers 21 to positions in which they will immediately engage the flange 18 and lock it to the internal gear wheel 15 when the shaft 10 is forwardly rotated.

The shaft 10 is revolubly mounted in two ball bearings 23 respectively mounted in brackets 24 fastened respectively to the outer sides of the arms of the fork 4, by removable screws 25.

The following described braking mechanism is provided. The left end of the hub 7, as viewed in Fig. 4, is provided with an annular peripheral flange 26, which is concentric with the axis of the hub 7, and in which is loosely fitted a brake shoe comprising, in the particular form shown an expansible transversely divided ring 27, which may be metal, such as cast iron, cast steel, or other suitable material, and which is preferably resilient.

For expanding the ring brake shoe 27 against the inner side of the annular flange 26, to apply the brake, two toggle members 28 have one set of ends pivoted to two lugs respectively fastened to the inner side of the divided brake shoe ring 27 adjacent to the ends thereof and designated by 29.

Pivoted to the other ends of the toggle members 28 is a link 30, which is pivoted to a crank 31 on a brake actuating member 32 pivotally mounted on the driving shaft 10, Figs. 4 and 7. The crank 31 is held from revolving on the brake member 32 by a removable key pin 33, Fig. 7, fitted in a hole between the crank and brake member 32.

The periphery of the brake actuating member 32 is provided with one or more notches 34, Fig. 8. The bottoms of said notches 34, like those of the notches 20, are eccentric to the shaft 10, and are preferably arcuate, and converge in depth counterclockwise, as shown in Fig. 8, toward an annular peripheral flange 35 concentrically provided on the inner end of a clutch member 36, which is fastened removably on the shaft 10 by a removable pin 37, Fig. 4.

Respectively mounted in the notches 34 are two rollers 38, which are adapted, when the shaft 10 is turned rearwardly by pressure applied in the proper direction on either of the pedal cranks 11, to lock together the clutch member 36 and the brake actuating member 32.

Rearward turning of the shaft 10 in the direction indicated by the arrows in Figs. 7 and 8, will cause the rollers 38 to be locked between the clutch flange 35 and the brake actuating member 36, thereby turning the latter clock-wise, as viewed in Fig. 7, and pushing downwardly the link 30, which will cause the toggle members 28 to push outwardly the lugs 29, thus expanding the brake shoe ring 27 against the hub flange 26 with a degree of pressure thereagainst corresponding to the pressure applied by the foot on the operating pedal crank 11.

On release of the pressure by the foot, or on forward pedalling, the annular clutch flange 35 will move the rollers 38 toward the larger ends of the notches 34, thus releasing the brake member 32 from the clutch member flange 35. The brake shoe ring 27 will then contract by its own resiliency, thus removing the braking pressure from the hub flange 26.

As shown in Fig. 7, a coil spring 39 may have its ends respectively attached to the lugs 29, the tension of the spring 39 being such that it will tend to draw the end portions of the divided ring brake shoe 27 toward each other, and thus contract the brake shoe. When the brake shoe is of resilient material, the spring 39 may be eliminated.

In the notches 34 are respectively mounted two U shaped, or other shaped, springs 40 which respectively bear against the adjacent ends of the notches 34 and against the rollers 38, said springs being in the larger ends of the notches 34. These two springs keep the rollers 38 in position for immediate locking action upon the rearward turning of the driving shaft 10, by pushing backward on either pedal 12.

For closing the adjacent end of the hub 7, a circular plate 41 has through it a hole through which extends the brake member 32. The plate 41 is next to the outer end of but not fastened to the hub flange 26. A screw 41 in the adjacent bracket 24 fits a hole in the plate 41 to hold the latter from turning.

In operating the apparatus, upon forwardly pedalling in the usual manner, the shaft 10 being forwardly revolved, the clutch flange 18 will cause the rollers 21 to lock with the internal gear wheel 15, which will revolve the wheel 1 through the gear wheel 14 fastened on the hub 7 of the wheel 1.

By holding the pedals 12 still, the machine will coast, the rollers 21 being released from the locking engagement by the forward revolving of the wheel 1.

To apply the brake ring shoe 27 to the hub flange 26, the rider pushes backwardly on either pedal 12, in any position of the latter which is convenient for such backward pushing. The clutch flange 35 will then cause the rollers 38 to lockingly engage the brake actuating member 32 and the latter will be rearwardly turned so as to cause its crank 31 to expand the ring brake shoe 27 against the hub flange 26 through the intermediacy of the link 30 and toggle members 28, and against the tension of the spring 39, when the latter is employed.

Upon forward movement of the shaft 10, the brake shoe will be released from braking engagement with the hub flange 26, in the manner already described.

I do not limit my invention to the structure shown and described, as many modifications, within the scope of the appended claims, may be made without departing from the spirit of my invention.

What I claim is:—

1. In a cycle having a frame and a carrying wheel rotatable thereon, a driving member rotatable on said frame, an internal gear wheel revoluble on said member, means connecting said member and said gear wheel for rotating the latter, and a gear wheel meshing with said internal gear wheel and mounted on and revoluble with said carrying wheel.

2. In a cycle having a frame and a carrying wheel rotatable thereon, a driving member rotatable on said frame, a gear wheel on and revoluble with said carrying wheel, an internal gear wheel revoluble on said driving member and meshing with said gear wheel, and means connecting said driving member and said internal gear wheel by which the latter is forwardly revolved when said driving member is forwardly revolved, and which permits said internal gear wheel to revolve forwardly when said driving member is stationary.

3. In a cycle having a frame and a carrying wheel rotatable thereon and having a tubular hub, a driving member extending through said hub and having driving cranks at opposite ends respectively and rotatable in said frame, a gear wheel on and revoluble with said carrying wheel, an internal gear wheel revoluble on said driving member and meshing with said gear wheel, and means connecting said driving member and said internal gear wheel by which the latter is forwardly revolved when said driving member is forwardly revolved, and which permits forward rotation of the internal gear wheel independently of said driving member.

4. In a cycle having a frame and a carrying wheel revoluble on said frame, a rotary driving member, an internal gear wheel revoluble on said driving member, a clutch member revoluble with said driving member, a locking roller adapted to engage and lock together said clutch member and said internal gear wheel when said driving member is forwardly rotated, and adapted to permit said gear wheel to revolve forwardly independently of said clutch member, and a gear wheel meshing with said internal gear wheel and mounted on and revoluble with said carrying wheel.

5. In a cycle having a frame and a carrying wheel revoluble thereon, a driving member rotatable on said frame, an internal gear wheel revoluble on said driving member and having a hub having a peripheral notch with an eccentric bottom, a clutch member revoluble with said driving member and having an annular flange encircling said hub, a locking roller in said notch arranged to lock together said hub and said flange when said driving member is forwardly rotated and permitting forward rotation of said internal gear wheel when said driving member is stopped, and a gear wheel meshing with said internal gear wheel and mounted on and revoluble with said carrying wheel.

6. In a cycle having a frame and a carrying wheel revoluble on said frame and having a tubular hub, a driving member extending through said hub eccentric to the axis of the latter and revoluble on said frame, a gear wheel on and revoluble with said carrying wheel, an internal gear wheel meshing with said gear wheel and revoluble on said driving member, and clutch means connecting said driving member and said internal gear wheel by which the latter may be forwardly rotated when the driving member is forwardly rotated, and which permits independent forward rotation of the internal gear wheel on said driving member.

7. In a cycle having a frame and a carrying wheel having a tubular hub revoluble on said frame, a driving member extending through said hub eccentrically to the axis of the hub and revoluble on said frame and having driving cranks at opposite ends respectively, and driving gearing connecting said driving member and said wheel.

8. In a cycle having a frame and a carrying wheel having a tubular hub revoluble on said frame, a driving member extending through said hub eccentrically to the axis of said hub and revoluble on said frame and having driving cranks at opposite ends respectively, a gear wheel fastened to said wheel and revoluble therewith, and driving means, including a gear wheel meshing with said first named gear wheel, connected with and actuated by said driving member.

9. In a cycle having a frame and a carrying wheel having a tubular hub revoluble on said frame, a driving member extending through said hub eccentrically to the axis of said hub and revoluble on said frame, a gear wheel on and revoluble with said wheel, an internal gear wheel meshing with said first named gear wheel, and means connecting said driving member with said internal gear wheel for revolving the latter.

In testimony whereof I have signed my name to this specification.

GARFIELD A. ROBERDS.